United States Patent
Nica et al.

(10) Patent No.: US 8,429,151 B2
(45) Date of Patent: Apr. 23, 2013

(54) HIGHLY ADAPTABLE QUERY OPTIMIZER SEARCH SPACE GENERATION PROCESS

(75) Inventors: Anisoara Nica, Waterloo (CA); Ian Lorne Charlesworth, Kingston (CA)

(73) Assignee: iAnywhere Solutions, Inc., Dublin, CA (US)

( * ) Notice: Subject to any disclaimer, the term of this patent is extended or adjusted under 35 U.S.C. 154(b) by 80 days.

(21) Appl. No.: 12/951,628

(22) Filed: Nov. 22, 2010

(65) Prior Publication Data

US 2012/0130988 A1    May 24, 2012

(51) Int. Cl.
*G06F 7/00* (2006.01)
(52) U.S. Cl.
USPC .......................................... 707/718; 707/719
(58) Field of Classification Search .................. 707/718
See application file for complete search history.

(56) References Cited

U.S. PATENT DOCUMENTS

| | | | | |
|---|---|---|---|---|
| 2003/0187831 | A1* | 10/2003 | Bestgen et al. | 707/3 |
| 2004/0030677 | A1* | 2/2004 | Young-Lai | 707/2 |
| 2004/0220923 | A1* | 11/2004 | Nica | 707/3 |
| 2005/0004892 | A1 | 1/2005 | Brundage et al. | |
| 2007/0050328 | A1* | 3/2007 | Li et al. | 707/2 |
| 2007/0219951 | A1* | 9/2007 | Ahmed et al. | 707/2 |
| 2007/0239673 | A1 | 10/2007 | Barsness et al. | |
| 2009/0234800 | A1 | 9/2009 | Antani et al. | |
| 2012/0259840 | A1* | 10/2012 | Nica | 707/719 |

OTHER PUBLICATIONS

International Search Report and the Written Opinion of the International Searching Authority directed to related International Patent Application No. PCT/US2011/059552, mailed Apr. 10, 2012, from the Korean Intellectual Property Office; 6 pages.

\* cited by examiner

*Primary Examiner* — Jensen Hu
(74) *Attorney, Agent, or Firm* — Sterne, Kessler, Goldstein & Fox PLLC (57) ABSTRACT

Systems, methods and articles of manufacture for determining at least one algorithm from a pool of algorithms to optimize a query. An embodiment includes building optimization blocks for the subplan, determining the complexity of the subplan based on the optimization blocks and selecting an algorithm from a pool of search space generation algorithms based on complexity of the subplan and characteristics of the selected algorithm, and optimizing the subplan with the selected algorithm.

17 Claims, 5 Drawing Sheets

HIGHLY ADAPTABLE QUERY OPTIMIZER SEARCH SPACE GENERATION PROCESS

BACKGROUND OF THE INVENTION

1. Field of Invention

The invention relates generally to databases and more specifically to query optimization.

2. Description of the Background Art

Computer databases have become a prevalent means for data storage and retrieval. A database user will commonly access the underlying data in a database using a Database Management System ("DBMS"). A user issues a query to the DBMS that conforms to a defined query language. This simplifies the user's interactions with the database by not requiring that the user know or understand the underlying structure of the physical database. Because of this, however, it is imperative that the DBMS execute the query in a manner which is most efficient for the underlying database.

Figure 1:
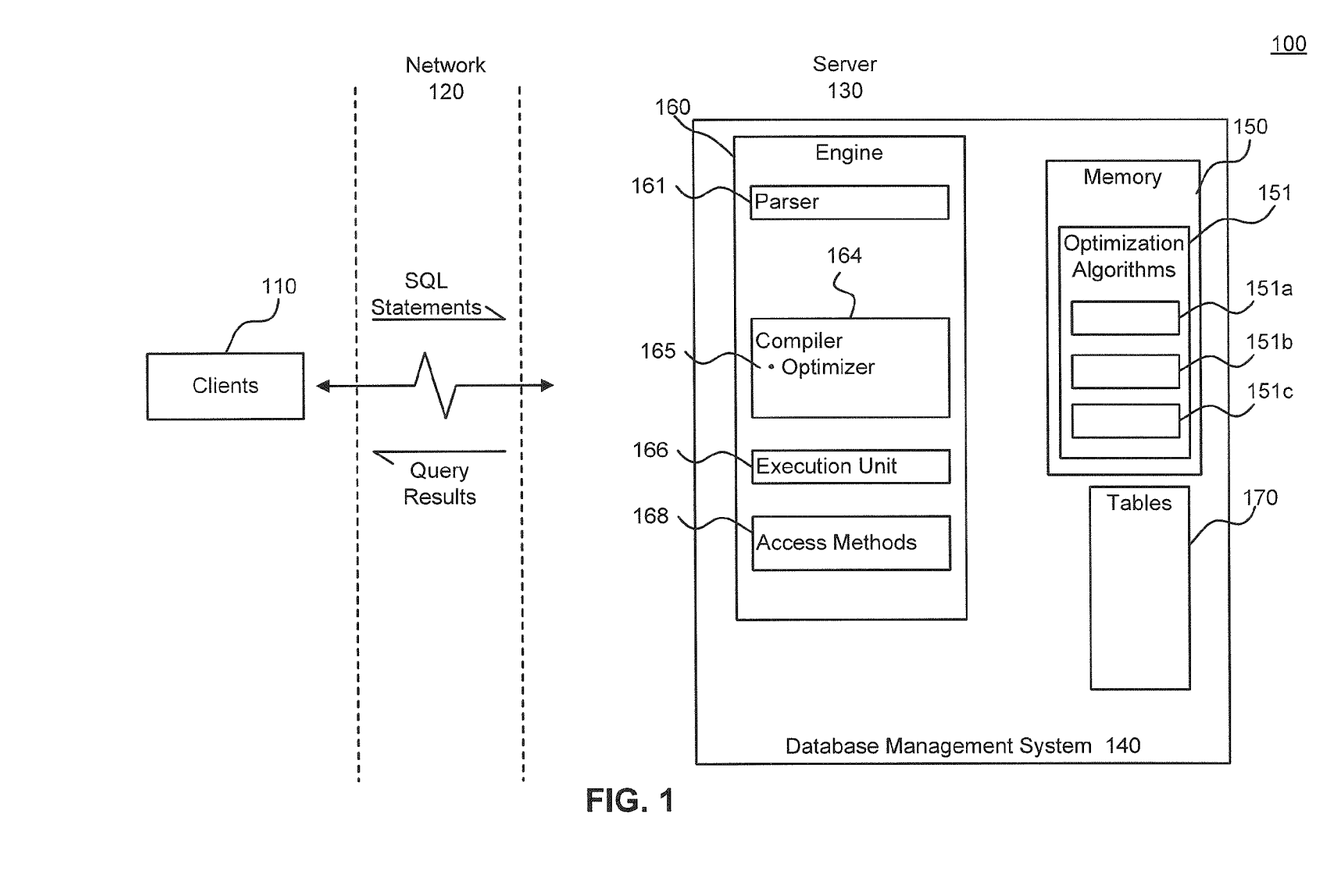
FIG. 1 is an example database computing environment in which embodiments of the claimed invention can be implemented.

Referring to FIG. 1, a DBMS 140 includes a compiler 164 that houses query optimizers such as a query optimizer 165. Query optimizer 165 determines the most efficient method to execute a query. When a client 110 writes an SQL query it is sent to DBMS 140, client 110 does not specify how the query should be executed by DBMS 140. Therefore, an effective design of the query optimizer 165 is critical to producing an efficient DBMS 140.

Query optimizer 165 analyzes the query and determines an access plan. This includes, for example, choosing the access method for each table accessed, choosing the order in which to perform a join operation on the tables, and choosing the join method to be used in each join operation. As there are typically many strategies for executing a given query using combinations of these operations, query optimizer 165 generates and evaluates a number of strategies from which to select the best one by way of an enumeration process (or "search space generation process"). A discussion of example optimizing strategies is provided in commonly-owned U.S. Pat. No. 7,184,998, issued Feb. 27, 2007, which is herein incorporated by reference in its entirety.

Conventionally, the query optimizer 165 uses a single optimization algorithm to determine strategies and form an access plan for optimizing a query. The same algorithm is used even though query optimizer 165 is executed on different platforms equipped with different system resources. Thus, if query optimizer 165 runs out of the available system resources during the optimization process, query optimizer 165 will fail to develop an access plan. This results in DBMS 140 executing a query without any optimization by a "brute force" approach or rejecting the query without executing the query. Thus, what is needed is an improved query optimizer 165 that can optimize a query using a query optimization algorithm that is selected from a plurality of available query optimization algorithms, where in an embodiment the selected algorithm is the one that is least expensive in light of the complexity of the query and the available system resources. What is also needed is query optimizer 165 that selects an algorithm that will create an access plan to optimize a query given the available system resources.

Accordingly, systems, methods and articles of manufacture are needed that allow query optimizer 165 to select a query optimization algorithm based on available system resources that can efficiently optimize a search performed by a query.

BRIEF SUMMARY OF THE INVENTION

Embodiments of the claimed invention relate to determining algorithms that will optimize a database search defined by a query. In an embodiment a query is divided into query blocks. A subplan is generated for each query block. A query optimizer builds building blocks for each subplan, determines the complexity of the subplan and selects a query optimization algorithm that generates an access plan from a pool of search space generation algorithms based on the building blocks and the complexity of the subplan. The query optimizer then optimizes the query by optimizing each subplan with the selected algorithm.

In another embodiment, the state of the server hosting the Database Management System is determined and the algorithm for a subplan is selected based on the state of the server along with the above referenced criteria.

In another embodiment, the query optimizer determines the complexity of the subplan by analyzing the properties of a hypergraph associated with the subplan.

In another embodiment, the query optimizer always selects algorithm that generates the access plan for the subplan.

In another embodiment, the query optimizer selects an inexpensive query optimization algorithm to optimize the subplan, and avoids expensive optimization techniques if the cost of query optimization using any of the expensive algorithms is more than the maximum allocated cost for optimizing the subplan.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the claimed invention and, together with the description, further serve to explain the principles of the invention and to enable a person skilled in the relevant art to make and use the invention.

The claimed invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION OF THE INVENTION

1. Introduction

The following detailed description of the claimed invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It is apparent to a person skilled in the art that the claimed invention, as described below, can be implemented in many different embodiments of software, hardware, firmware, and/or the entities illustrated in the figures. Any actual software code with the specialized control of hardware to implement the claimed invention is not limiting of the claimed invention. Thus, the operational behavior of the claimed invention will be described with the understanding that modifications and variations of the embodiments are possible, given the level of detail presented herein.

FIG. 1 is an example database computing environment 100 in which embodiments of the claimed invention can be implemented. A client 110 is operable to communicate with a database server 130 using DBMS 140. Although client 110 is represented in FIG. 1 as a separate physical machine from DBMS 140, this is presented by way of example, and not limitation. In an additional embodiment, client 110 occupies the same physical system as DBMS 140. In a further embodiment, client 110 is a software application which requires access to DBMS 140, where in an additional embodiment client 110 is a human user manually requesting access to DBMS 140. Throughout this specification, the terms client and user will be used interchangeably to refer to any hardware, software, or human requestor accessing DBMS 140 either manually or automatically, such as client 110.

DBMS 140 receives a query from client 110. A query is used to request, modify, append, or otherwise manipulate information in a database storage 170. A query is presented to DBMS 140 by client 110 using syntax which conforms to a query language. In a non-limiting example embodiment the query language is the Structured Query Language ("SQL"), however a query may be defined by another language. DBMS 140 is able to interpret the query in accordance with the query language and generate requests to database storage 170.

DBMS 140 comprises of a parser 161, a normalizer (not shown), a compiler 164, an execution unit 166, and access methods 168.

After DBMS 140 receives a query from client 110, it is parsed by the parser 161. In an embodiment, parser 161 converts a query into a binary tree data structure, although other kinds of data structures may be used. The tree data structure represents the query in a format that is convenient for DBMS 140.

Parser 161 passes the query to a normalizer (not shown). The function of the normalizer is to normalize the parsed query. Normalizer eliminates redundant data and performs initial error checking on the parsed query such as confirming that the names of the tables in the query conform to those in data storage 170 and that relationships among tables as described by the query are valid.

Normalizer passes the normalized query to a compiler 164 that includes query optimizer 165. Query optimizer 165 optimizes the query.

Query optimizer 165 determines an approach or a "cost based analysis" by which to optimally manipulate the information in the database storage 170 in accordance with the query semantics. This approach is commonly termed an "access plan" or "query plan." Based on the considerations programmed into query optimizer 165 in selecting an appropriate access plan, query optimizer 165 is able to select a "best" or "optimal" access plan. The terms "best" and "optimal" access plan may be used interchangeable in the specification. One skilled in the relevant art will appreciate that the "best" or "optimal" access plan selected by query optimizer 165 is not necessarily the absolute optimal access plan which could be implemented, but rather an access plan which is deemed by rules designed into query optimizer 165 to be the best of those access plans as determined by some objective or subjective criteria. This access plan is then used to manipulate data in the database storage 170.

In an embodiment, query optimizer 165 determines an optimal access plan by dividing a query into one or more query blocks. A query block comprises an atomic portion of a query. A subplan is created for each query block. A subplan is the smallest SQL table expression for which the optimization process is invoked one or more times. A subplan can consist of a set of relations and/or other subplans. Query optimizer 165 selects an optimization algorithm for each subplan. The selected algorithm is used to determine an access plan, which is used to optimize the subplan. As discussed above, conventional optimizers use a single optimization algorithm to perform this function for all subplans. In contrast, the optimizer 165 of the invention chooses an optimization algorithm among a number of available search space generation algorithms or algorithms 151 to process any given subplan, where such selection is based on a number of criteria (as described below). The process is repeated for each subplan, until each subplan has an optimal access plan that is found by one of the algorithms 151 (individually selected for each subplan) stored in memory 150 of DBMS 140.

In an embodiment, available query optimization algorithms 151 are stored in memory 150 of DBMS 140. As discussed, query optimizer 165 selects an algorithm for each subplan from among the algorithms 151 to generate an optimal access plan and optimize each subplan. In an embodiment each algorithm 151 has different characteristics, such as different resource requirements, classes of queries which algorithm 151 can handle and quality of access plans. In one embodiment, one of the algorithms 151 stored in memory 150 is a backtracking algorithm without memoization over the left deep tree access plans 151a. In another embodiment, one of the algorithms 151 is a backtracking algorithm with memoization over the left deep tree access plans 151b. In yet another embodiment, one of algorithms 151 is a dynamic programming algorithm over the bushy tree access plans 151c. The query optimizer 165 selects one of the above mentioned algorithms for each subplan in accordance with steps described hereunder and illustrated in FIG. 2. Moreover, algorithms 151 described herein are presented for purposes of illustration arid not limitation, and a person skilled in the art will appreciate that other algorithms may be stored in memory 150 and used by query optimizer 165.

In an embodiment, the backtracking algorithm without memoization over the left-deep tree access plans 151a is an inexpensive algorithm in terms of the server's 130 resources and utilization. The backtracking algorithm without memoization over the left-deep tree access plans 151a is intensive in terms of the CPU consumption of the server 130, but does not use a great deal of system memory 150. An advantage of the backtracking algorithm without memoization over the left-deep tree access plans 151a is that it always generates an access plan for a subplan and avoids the brute force method for executing a subplan that sometimes results using conventional approaches.

In an embodiment, the backtracking algorithm with memoization over the left deep tree access plans 151b is less intensive in terms of CPU consumption, but utilizes more memory than algorithm 151a.

Memoization is an optimization technique known to a person skilled in the art. Memoization is a technique where the inputs and outputs of function calls are saved in system memory 150. Because the inputs and outputs of the function call are saved, the server avoids processing the function with the same inputs more than once and simply retrieves an output that is stored in memory 150. As a result, the server 130 is able to redirect the CPU time to other functions or processes.

In an embodiment, of the example algorithms 151 discussed herein, the bottom up dynamic programming algorithm with memoization over bushy-tree access plans 151c is most intensive in terns of CPU usage and memory utilization. The bottom up dynamic programming algorithm with memoization over bushy-tree access plans 151c usually determines a better access plan for a subplan than algorithms 151a and 151b. However, unlike the backtracking algorithm without memoization 151a, the bottom up dynamic programming algorithm with memoization over bushy-tree access plans 151c must run to completion in order to generate an access plan. Therefore, in a system where CPU consumption is high and/or available memory is scarce, the dynamic programming algorithm with memoization over bushy-tree access plans 151c may run out of system resources and fail to run to completion. As a result, algorithm 151c may fail to generate an access plan. In conventional systems, if the dynamic programming algorithm with memoization over bushy-tree access plans 151c or another algorithm fails to generate an access plan, query optimization is not achieved. This results in a conventional DBMS 140 executing a query by a brute force approach or by rejecting the query request without executing the query.

The above described algorithms are presented by way of example and not limitation, and one skilled in the relevant arts will appreciate that there are other algorithms that can be utilized by query optimizer 165. The key, however, is for each algorithm to perform well in a different environment and with different kinds of queries. In an embodiment, the algorithms 151 are varied in their advantages, disadvantages and/or functionality, so collectively algorithms 151 perform well over multiple environments. Moreover, in an embodiment, at least one algorithm always generates an access plan for any and all subplans.

In order to select an algorithm to optimize the subplan being considered, query optimizer 165 analyzes several factors such as inherent characteristics of the subplan, the properties of each algorithm of algorithms 151, the current state of the server, and the available system resources.

In an embodiment, the characteristics of the subplan are analyzed by examining the hypergraph associated with the subplan. For example, by analyzing the characteristics of the hypergraph where the vertices correspond to subplan quantifiers and hyperedges correspond to predicates between the quantifiers as defined in the subplan, a person skilled in the art would understand to approximate the number of subtrees that must be saved in a memoization table located in memory 150 and enumerated by the CPU processor. The number of subtrees saved in the memoization table correspond to the amount of system memory that must be allocated to optimize subplan S, using memoization algorithms such as 151b and 151c. The number of subtrees that must be enumerated are indicative of the CPU consumption that server 130 requires to optimize subplan S.

In another embodiment the subplan characteristics indicate the number of quantifier nodes. The number of quantifier nodes is indicative of the number of relations and nested subplans that must be enumerated for each subplan.

In another embodiment, query optimizer 165 estimates the number of nodes that must be enumerated. The estimated number of nodes is indicative of the estimated number of join strategies that the optimizer must look at in order to determine an optimal access plan. A person skilled in the art would understand that the number of nodes estimate in a subplan is used to estimate the CPU time required for algorithm 151 to generate a search space. In an embodiment and for purposes of this patent application, CPU time is measured in microseconds. A discussion of example estimating search space by estimating number of nodes is provided by K. Ono, G. Lohman "Measuring the complexity of join enumeration in query optimization", In Proceedings of International Conference on Very Large Data Bases (VLDB) pages 314-325, 1990, which is herein incorporated by reference in its entirety.

The current state of the server 130 is another factor used to determine an optimal access plan. The current state of the server 130 is used to estimate the amount of CPU time query optimizer 165 needs to optimize each subplan using a particular algorithm 151. For example, an algorithm that can determine an optimal access plan for a subplan on a busy server 130 may not be used when the server 130 is free.

Also, in an embodiment, an algorithm such as 151c may use more than one CPU in parallel to execute subtasks required for determining an access plan, thus requiring less overall total time. However, algorithms such as 151a and 151b cannot execute any work in parallel, and require a single CPU which usually requires more overall total time.

In an embodiment, DBMS 140 includes a memory governor (not shown) to allocate memory. A memory governor determines an amount of memory available for a particular process such as query optimization. Memory governor typically determines the amount of available memory based on the current state of the server. For example, the amount of memory that is available on a handheld device is different than the amount of memory and CPU time that are available on a cloud or a virtual server environment that has a large amount of memory. However, if the server is already executing a memory intensive process, only a limited amount of memory may be available for a new query optimization process. Thus, depending on a type and state of server 130, query optimizer 165 may select a different algorithm to optimize the same subplan.

In an embodiment, available system resources depend on multiple factors. For example, different platforms hosting DBMS 140 have different configurations. In another example, the resources available to DBMS 140 may vary as other applications that share the platform may consume some of the resources. Additionally, even if the resources available to DBMS 140 remain constant, the resources may vary with the number of parallel requests that DBMS 140 processes in addition to determining the access plan and optimizing the query. The above listed factors, have an effect on available memory and CPU consumption as described herein.

Finally, inherent properties of an algorithm such as the amount of memory and CPU time that each algorithm 151 requires to optimize the subplan are also analyzed.

In an embodiment, DBMS 140 uses a calibration process to estimate CPU time required to generate an access plan using each algorithm 151 for each subplan. CPU time is estimated as "cost per unit of work." In an embodiment, a unit of work is CPU time that each algorithm 151 requires to process one node in the subplan using optimization process. The calibration process depends on the hardware that hosts DBMS 140. To estimate the cost per unit of work for each algorithm 151, the calibration process executes a query with predefined workload units. The calibration process executes the query with each algorithm 151 and calculates the execution time for each algorithm 151. The execution time is divided by predefined number of workload units. Thus the cost per unit of work for each algorithm 151 is determined as a measure of CPU time. The calibration process also calculates the cost per unit of work for different types of queries to determine a better approximation of the CPU time required for different queries.

An estimate of the memory each algorithm 151 requires to determine an access plan is estimated using a memoization table. The memory is estimated for algorithms using memoization such as 151*b* and 151*c*. Each entry in a memorization table represents a saved partial access plan that maybe be used to determine an access plan for a subplan. For example, in an embodiment, algorithm 151*b* saves the partial access plan cost that is the best cost estimate for a subsets of quantifiers. Thus, in an embodiment, for a subplan with N quantifiers, algorithm 151 needs a maximum memory space that is equal to $2^N$ * size(best cost structure).

The above mentioned factors are calculated for each algorithm 151 by query optimizer 165 before it selects an algorithm that generates an optimal access plan for a subplan. One skilled in the art will appreciate that those factors are given by way of example and not limitation, and that other factors may be taken into consideration when query optimizer 165 selects an algorithm.

The code generator (not shown) found in the compiler 164 translates the access plans selected by query optimizer 165 into an executable form. The access plans are executed by the execution unit 166 using the access methods 168.

2. Query Optimization Process

Figure 2:
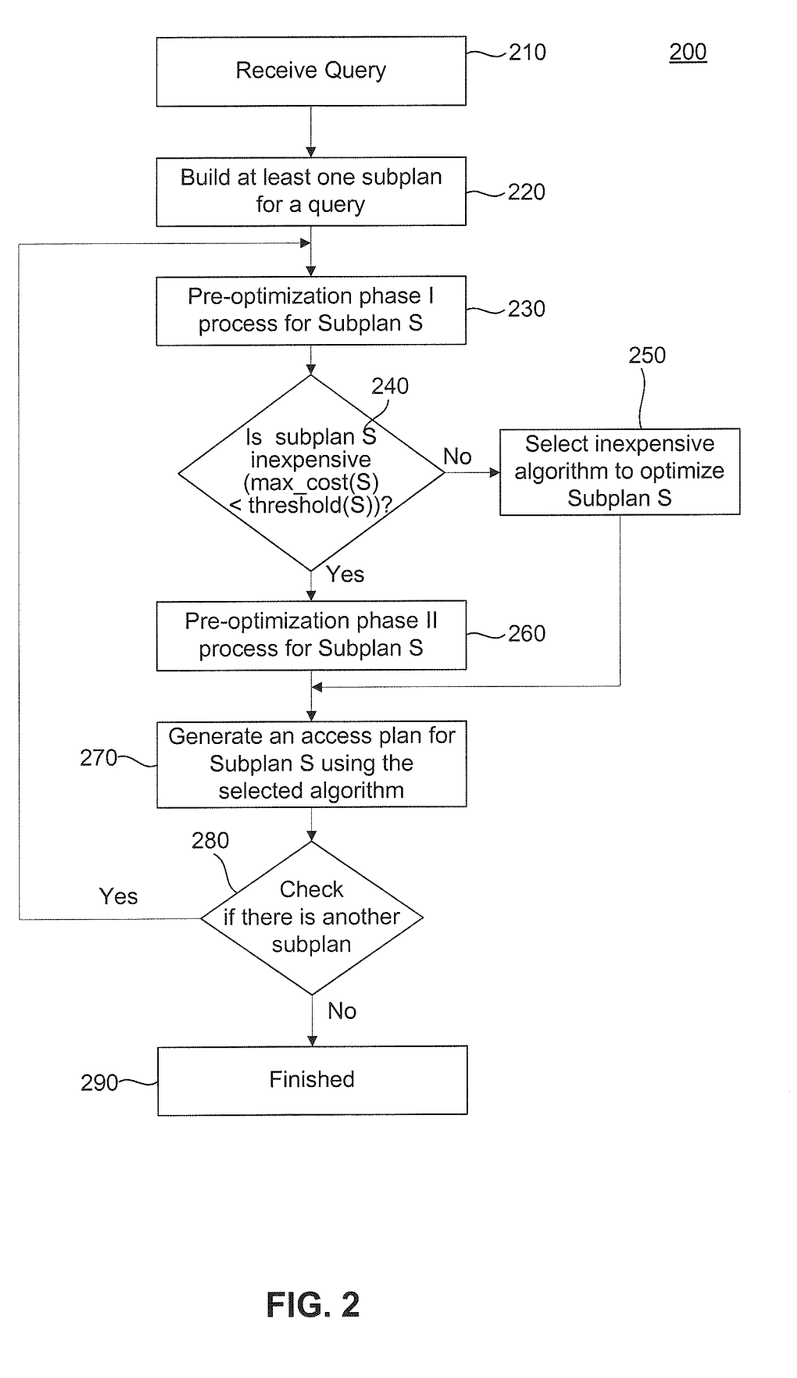
FIG. 2 is a flowchart illustrating steps by which a query optimizer is operable to select a query optimization algorithm that produces an access plan for subplan optimization in accordance with an embodiment of the claimed invention.

FIG. 2 flowchart illustrates an exemplary embodiment of query optimizer 165.

In an embodiment, query optimizer 165 is operable to select one or more algorithms to optimize a query.

At step 210, query optimizer 165 receives a normalized query.

At step 220, query optimizer 165 partitions the normalized query into one or more query blocks. Each query block comprises an atomic portion of a query. Query optimizer 165 creates a subplan ("subplan S") for each query block based on grouping portions of each query block. Query optimizer 165 then determines an initial access plan and a corresponding algorithm 151 to optimize the subplan in steps 230 through 260.

Figure 3:
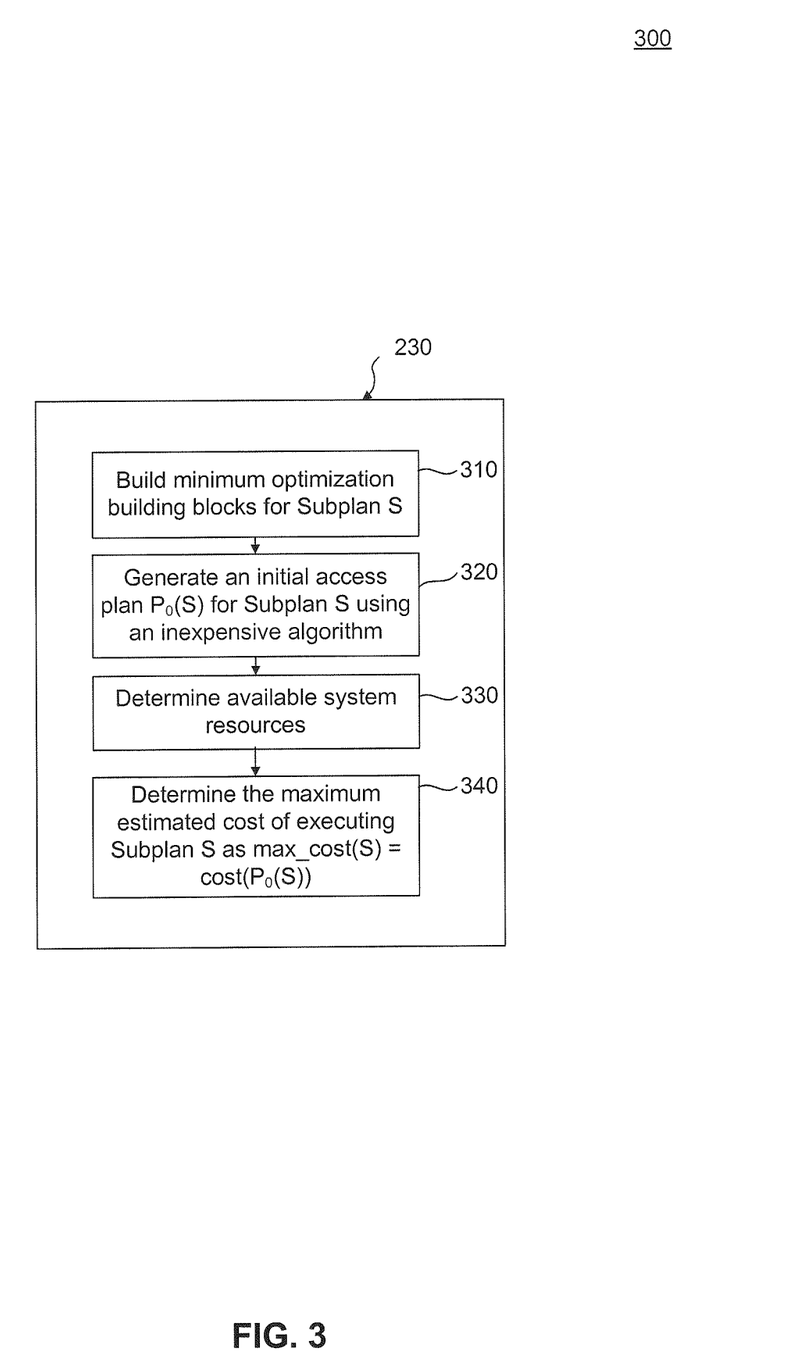
FIG. 3 is a flowchart illustrating the steps of a pre-optimization phase I process in accordance with an embodiment of the claimed invention.

In step 230, a pre-optimization phase I is performed for subplan S. FIG. 3 is a flowchart illustrating an exemplary embodiment of the pre-optimization phase I process 230.

The pre-optimization phase I process begins at step 310 when the query optimizer 165 builds minimum optimization building blocks for subplan S.

In an embodiment, at step 320 query optimizer 165 generates an initial access plan by using the optimization building blocks and an inexpensive algorithm such as the backtracking algorithm without memoization over the left-deep tree access plans 151*a*. In an embodiment, the inexpensive algorithm requires few system resources and small amount of time to generate an initial access plan. However, persons skilled in the art will appreciate that another inexpensive algorithm can be used. In another example, an inexpensive enumeration algorithm is a heuristic algorithm which builds an initial access plan based on the original syntax of the query.

In an embodiment, the backtracking algorithm without memoization can be implemented with several different algorithm settings. The algorithm settings control the amount of resources and amount of time the inexpensive algorithm requires to generate an access plan. At step 320, the algorithm settings are set to generate an access plan quickly or to terminate the backtracking algorithm without memoization algorithm after it determines a first complete access plan.

In an embodiment, in step 320 the backtracking algorithm without memoization algorithm can always be used to generate an initial access plan $P_0(S)$ using a minimum amount of resources, for subplan S (and for any other subplan).

At step 330, query optimizer 165 determines the current state of DBMS 140, such as available memory 150 using the memory governor and CPU utilization as described above. In an embodiment, step 330 can be performed at any point prior to step 340 during the optimization phase I 230 process.

At step 340, query optimizer 165 determines the estimated cost of executing the initial access plan $P_0(S)$ of subplan S given the current state of the server 130 as determined in step 330: In an embodiment, the maximum estimated cost (max_cost(S)) for executing subplan S, is the cost of executing initial access plan $P_0(S)$ or cost($P_0(S)$), because the access plan selected by query optimizer 165 can only be as expensive as initial access plan $P_0(S)$ determined in optimization phase I.

In an embodiment, the cost of executing the access plan includes estimated memory utilization and CPU time. The cost of executing an access plan is determined by analyzing the properties of subplan S and characteristics of algorithm used in step 320 as described above.

Returning to FIG. 2, at step 240 query optimizer 165 determines whether the access plan produced by pre-optimization phase I process 230 for subplan S is a cost efficient access plan. Query optimizer 165 compares the estimated cost of executing the access plan for subplan S as determined in step 340, max cost(S), with a predefined threshold cost for executing subplan S. The cost of executing the access plan and the predefined cost are measured in microseconds. In an embodiment, cost of executing subplan S includes the CPU time and cost of I/O interfaces.

If the cost for executing subplan S determined in step 340 is less than the threshold cost, the inexpensive algorithm of step 320 is selected at step 250. If the inexpensive algorithm of step 320 is selected at step 250, query optimizer 165 bypasses pre-optimization phase process 260 that includes other optimization techniques such as materialized view matching, subquery optimization, unary operators, etc., and proceeds to step 270.

At step 270, query optimizer 165 proceeds to optimize subplan S using the selected search space generation algorithm decided at step 250 or at step 260. In an embodiment, if the inexpensive algorithm is selected, the algorithm settings may be set for an inexpensive algorithm to complete generating an access plan for the entire subplan S. Query optimizer uses the code generator (not shown in FIG. 1) to translate the access plan of step 320 into an executable form. The executable form of the access plan is executed by the execution unit 166 using access methods 168.

At step 280, query optimizer 165 determines if there is another subplan created in step 220 that requires an access plan. If there is another subplan, query optimizer 165 repeats steps 230 through 270 to determine an access plan for the next subplan.

If no additional subplans require access plans, then query optimizer 165 proceeds to step 290. At step 290, the optimization process for the entire query is complete.

Going back to step 240, if the estimated cost for executing subplan S determined in step 340 is greater than the threshold cost, query optimizer 165 attempts to identify if a more expensive algorithm can generate an access plan for subplan S. In this case, query optimizer 165 proceeds to the pre-optimization phase II process at step 260. Pre-optimization phase II process 260 includes relatively expensive optimization techniques used to find an access plan for subplan S, such as materialized view matching, subquery optimization, cost-based optimization of the unary operators, cost-based optimization using multi-index scans, cost-based optimization of parallel operators, and other optimization techniques known to a person skilled in the art.

It is noted, the decision in step 240 of whether to use the inexpensive algorithm of step 320 depends on the current state of the server 130. Therefore, the inexpensive algorithm may be selected in one instance to optimize subplan S if the server 130 is busy, yet it may be bypassed in another instance in favor of proceeding to pre-optimization phase II 260 process if the server 130 is free. Similarly, an inexpensive algorithm such as 151a may be selected to optimize a query on a server 130 located on a handheld device that does not have a great deal of memory, but not on a virtual server 130 that has a vast amount memory, parallel processors and other resources.

Figure 4:
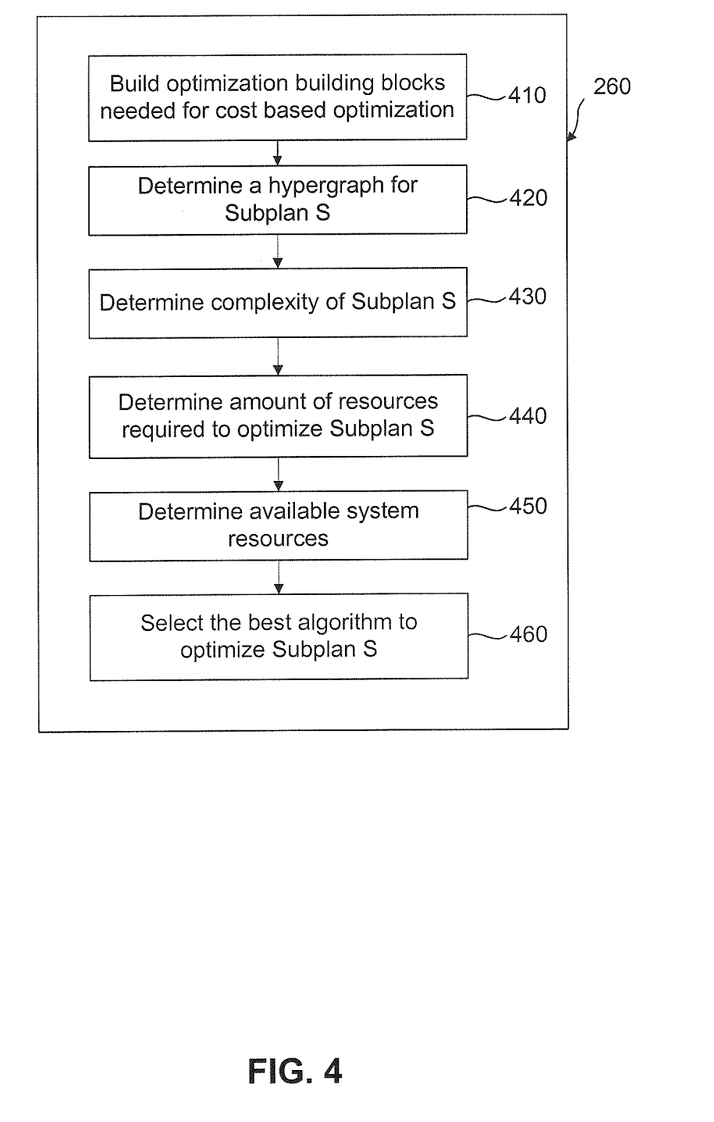
FIG. 4 is a flowchart illustrating the steps of a pre-optimization phase II process in accordance with the embodiment of the claimed invention.

FIG. 4 is a flowchart illustrating an exemplary embodiment of the pre-optimization phase II process 260.

In an embodiment, the pre-optimization phase II process 260 begins at step 410, At step 410, query optimizer 165 creates pre-optimization building blocks to perform cost based optimization such as view matching, subquery optimization, unary operators, etc., for subplan S. The list of the cost based optimization methods recited herein is not exhaustive and a person skilled in the art will appreciate that other cost based optimization methods can be used.

At step 420, query optimizer 165 generates a hypergraph for subplan S. One skilled in the art will appreciate that the hypergraph for subplan S is generated by executing a simplification algorithm on a simple, undirected graph representation of subplan S.

At step 430, in an embodiment, the complexity of subplan S is determined by analyzing the algebraic properties of a hypergraph. The characteristics of a hypergraph such as its shape and its size are indicative of the size of the search space for subplan S as described above.

Once query optimizer 165 determines the complexity of subplan S, pre-optimization phase II process 260 proceeds to step 440. At step 440, query optimizer 165 determines the amount of resources such as the amount of memory and CPU time that each algorithm in the pool of algorithms 151 requires to optimize subplan S. In an embodiment, the determination is based on the hypergraph properties determined in step 430, number of quantifier nodes in subplan S, number of nodes in subplan S that must be enumerated and properties inherent to each algorithm 151 that are determined using the calibration process and memoization table analysis described above.

At step 450, query optimizer 165 determines the available resources of the DBMS 140 such as available memory 150 allocated by the memory governor and available CPU time. One skilled in the art will appreciate that step 450 may be completed at any point prior to step 460 during the pre-optimization phase II process 260.

At step 460, query optimizer 165 selects an algorithm from the plurality of algorithms 151. In doing so, query optimizer 165 analyzes the system resources available for the optimization process in step 450 with the resources that each algorithm from the pool of algorithms 151 requires to optimize subplan S determined in step 440. For example, if the server 130 has sufficient memory 150 and CPU time to satisfy the requirements of all algorithms from the pool of algorithms 151, the query optimizer 165 will select the most expensive algorithm such as algorithm 151c to optimize subplan S. However, in an embodiment where there is sufficient memory to optimize subplan S with algorithms 151a or 151b, but not 151c, the query optimizer 165 will optimize subplan S using the algorithm that requires the least CPU time. In an embodiment, where the server 130 is busy and memory 150 is scarce, the query optimizer 165 will default to optimizing subplan S with algorithm 151a which can always optimize the query, with little resources, even if algorithm 151a was determined to be too expensive in step 240. At step 460, pre-optimization process phase II is complete, and query optimizer 165 proceeds to step 270, At step 270, query optimizer 165 generates an access plan using the algorithm selected in step 460 for subplan S or at step 250. Query optimizer 165 uses the code generator (not shown in FIG. 1) to translate the access plan into an executable form. The executable form of the access plan is executed by the execution unit 166 using access methods 168.

After subplan S is optimized, query optimizer 165 proceeds to step 280 as described above.

3. Example Computer System Implementation

Figure 5:
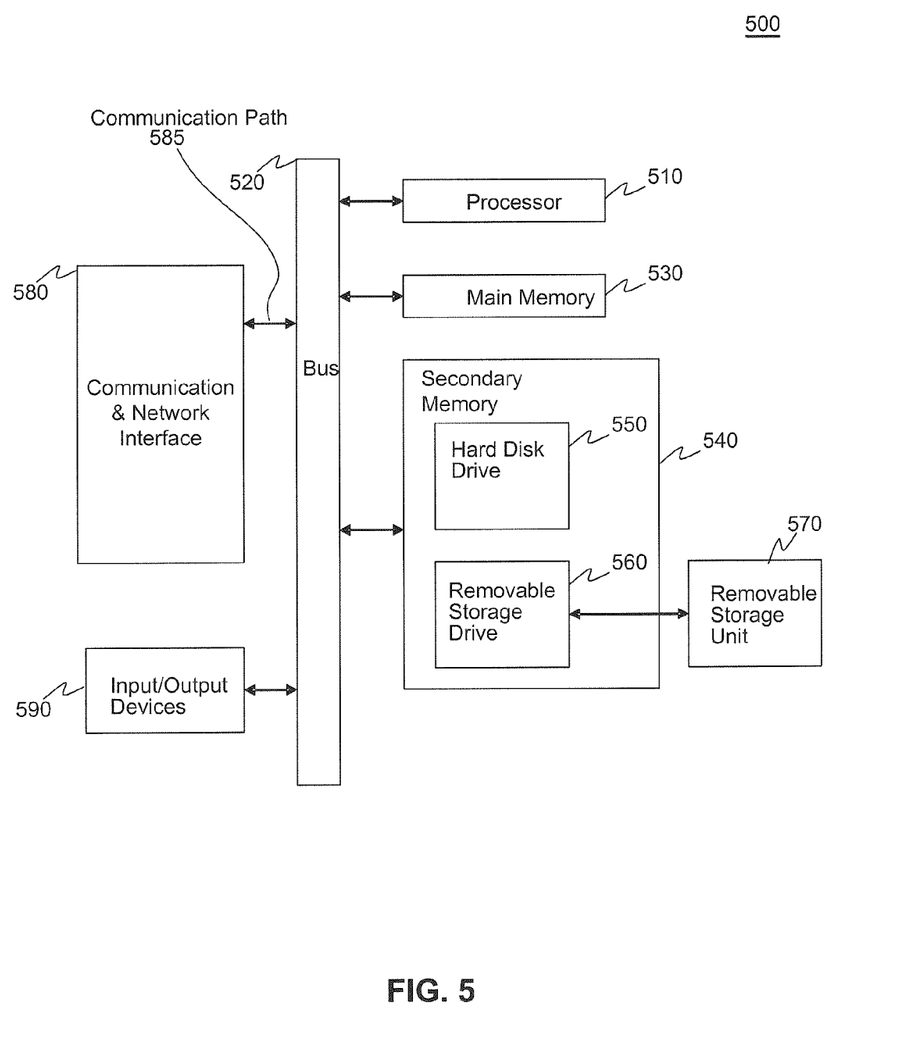
FIG. 5 depicts an example computer system in which embodiments of the claimed invention may be implemented.

Various aspects of the claimed invention can be implemented by software, firmware, hardware, or a combination thereof. FIG. 5 illustrates an example computer system 500 in which the claimed invention, or portions thereof, can be implemented as computer-readable code. For example, the methods illustrated by flowcharts 200 of FIG. 2, 300 of FIGS. 3 and 400 of FIG. 4 can be implemented in system 500. Various embodiments of the invention are described in terms of this example computer system 500. After reading this description, it will become apparent to a person skilled in the relevant art how to implement the invention using other computer systems and/or computer architectures.

Computer system 500 includes one or more processors, such as processor 510. Processor 510 can be a special purpose or a general purpose processor. Processor 510 is connected to a communication infrastructure 520 (for example, a bus or network).

Computer system 500 also includes a main memory 530, preferably random access memory (RAM), and may also include a secondary memory 540. Secondary memory 540 may include, for example, a hard disk drive 550, a removable storage drive 560, and/or a memory stick. Removable storage drive 560 may comprise a floppy disk drive, a magnetic tape drive, an optical disk drive, a flash memory, or the like. The removable storage drive 560 reads from and/or writes to a removable storage unit 570 in a well known manner. Removable storage unit 570 may comprise a floppy disk, magnetic tape, optical disk, etc. which is read by and written to by removable storage drive 560. As will be appreciated by persons skilled in the relevant art(s), removable storage unit 570 includes a computer usable storage medium having stored therein computer software and/or data.

In alternative implementations, secondary memory 550 may include other similar means for allowing computer programs or other instructions to be loaded into computer system 500. Such means may include, for example, a removable storage unit 570 and an interface 520. Examples of such means may include a program cartridge and cartridge interface (such as that found in video game devices), a removable memory chip (such as an EPROM, or PROM) and associated socket, and other removable storage units 570 and interfaces 520 which allow software and data to be transferred from the removable storage unit 570 to computer system 500.

Computer system 500 may also include a communications and network interface 580. Communications interface 580 allows software and data to be transferred between computer system 500 and external devices. Communications interface 580 may include a modem, a communications port, a PCM-CIA slot and card, or the like. Software and data transferred via communications interface 580 are in the form of signals which may be electronic, electromagnetic, optical, or other signals capable of being received by communications interface 580. These signals are provided to communications interface 580 via a communications path 585. Communications path 585 carries signals and may be implemented using wire or cable, fiber optics, a phone line, a cellular phone link, an RF link or other communications channels.

The network interface 580 allows the computer system 500 to communicate over communication networks or mediums such as LANs, WANs the Internet, etc. The network interface 580 may interface with remote sites or networks via wired or wireless connections.

In this document, the terms "computer program medium" and "computer usable medium" are used to generally refer to media such as removable storage unit 570, removable storage drive 560, and a hard disk installed in hard disk drive 550. Signals carried over communications path 585 can also embody the logic described herein. Computer program medium and computer usable medium can also refer to memories, such as main memory 530 and secondary memory 540, which can be memory semiconductors (e.g. DRAMs, etc.). These computer program products are means for providing software to computer system 500.

Computer programs (also called computer control logic) are stored in main memory 530 and/or secondary memory 540. Computer programs may also be received via communications interface 580. Such computer programs, when executed, enable computer system 500 to implement the claimed invention as discussed herein. In particular, the computer programs, when executed, enable processor 510 to implement the processes of the claimed invention, such as the steps in the methods illustrated by flowcharts 200 of FIG. 2, 300 of FIGS. 3 and 400 of FIG. 4. discussed above. Accordingly, such computer programs represent controllers of the computer system 500. Where the invention is implemented using software, the software may be stored in a computer program product and loaded into computer system 500 using removable storage drive 560, interface 520, hard drive 550 or communications interface 580.

The computer system 500 may also include input/output/display devices 590, such as keyboards, monitors, pointing devices, etc.

The invention is also directed to computer program products comprising software stored on any computer useable medium. Such software, when executed in one or more data processing device(s), causes a data processing device(s) to operate as described herein. Embodiments of the invention employ any computer useable or readable medium, known now or in the future. Examples of computer useable mediums include, but are not limited to primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

The claimed invention can work with software, hardware, and/or operating system implementations other than those described herein. Any software, hardware, and operating system implementations suitable for performing the functions described herein can be used.

4. Conclusion

It is to be appreciated that the Detailed Description section, and not the Summary and Abstract sections, is intended to be used to interpret the claims. The Summary and Abstract sections may set forth one or more but not all exemplary embodiments of the claimed invention as contemplated by the inventor(s), and thus, are not intended to limit the claimed invention and the appended claims in any way.

The claimed invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation and without departing from the general concept of the claimed invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the claimed invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not he read into or against the parent application.

What is claimed is:

1. A method for optimizing a search for a query, comprising:
   providing a subplan for an optimization block in the query;
   determining a maximum estimated cost for executing an access plan for the subplan using an inexpensive algorithm from a pool of search space generation algorithms;
   when the maximum estimated cost is greater than a threshold cost for generating the access plan for the subplan,
      analyzing algebraic properties of a hypergraph to determine complexity of the subplan for the optimization block;
      identifying characteristics of each algorithm from the pool of search space generation algorithms, wherein each algorithm is configured to generate an associated access plan for the subplan; and selecting an algorithm from the pool of search space generation algorithms based on the complexity of the subplan and characteristics of each algorithm; and when the maximum estimated cost is less than the threshold cost for generating the access plan for executing the subplan, selecting the inexpensive algorithm; and generating the access plan for the subplan using the selected algorithm to optimize the search for the query.

2. The method of claim 1, further comprising:

determining a current state of a server configured to generate the optimized access plan; and wherein selecting the algorithm further comprises selecting based on the current state of the server.

3. The method of claim 1, wherein at least one algorithm from the pool of search space generation algorithms guarantees to generate the access plan for optimizing the subplan.

4. A system for optimizing a search for a query, comprising:

a memory;

a processor communicatively coupled to the memory;

a pre-optimization module stored in the memory and executing on the processor and further configured to:

provide a subplan for an optimization block in the query;

determine a maximum estimated cost for an access plan for executing the subplan using an inexpensive algorithm from a pool of search space generation algorithms;

when the maximum estimated cost is greater than a threshold cost for generating the access plan for the subplan, analyze algebraic properties of a hypergraph to determine complexity of the subplan for the optimization block;

identify characteristics of each algorithm from the pool of search space generation algorithms, wherein each algorithm is configured to generate an associated access plan for the subplan; and select an algorithm from the pool of search space generation algorithms based on the complexity of the subplan and characteristics of each algorithm; and when the maximum estimated cost is less than the threshold cost for generating the access plan to execute the subplan, selecting the inexpensive algorithm; and an optimization module configured to:

generate the access plan for the subplan using the selected algorithm to optimize the search for the query.

5. The system of claim 4, wherein the pre-optimization module is further configured to determine a state of a server configured to generate the access plan and the optimization module is further configured to select the least expensive algorithm for generating the access plan based on the state of the server.

6. An article of manufacture including a non-transitory computer-readable medium having instructions stored thereon that, when executed by a computing device, cause said computing device to perform operations comprising:

providing a subplan for an optimization block in the query;

determining a maximum estimated cost for executing the subplan using an inexpensive algorithm from a pool of search space generation algorithms;

when the maximum estimated cost is greater than a threshold cost for generating the access plan for the subplan, analyzing algebraic properties of a hypergraph to determine complexity of the subplan for the optimization block;

identifying characteristics of each algorithm from the pool of search space generation algorithms, wherein each algorithm is configured to generate an associated access plan for the subplan; and selecting an algorithm from the pool of search space generation algorithms based on the complexity of the subplan and characteristics of each algorithm; and when the maximum estimated cost is less than the threshold cost for generating the access plan for the subplan, selecting the inexpensive algorithm; and generating the access plan for the subplan using the selected algorithm to optimize the search for the query.

7. The article of manufacture of claim 6, wherein the operations further comprise:

determining a current state of a server configured to generate the access plan; and wherein selecting the algorithm comprises selecting based on the current state of the server.

8. The article of manufacture of claim 6, wherein at least one algorithm from the pool of algorithms guarantees to generate the access plan for optimizing the subplan.

9. The method of claim 1, wherein the optimization block represents an atomic portion of the query.

10. The method of claim 1, wherein the inexpensive algorithm is a backtracking algorithm without memoization over a left deep tree access plans.

11. The method of claim 1, wherein the pool of search space generation algorithms includes at least one of a backtracking algorithm without memoization over left deep tree access plans, a backtracking algorithm with memoization over left deep tree access plans, and a dynamic programming algorithm over the bushy tree access plans.

12. The system of claim 4, wherein the optimization block represents an atomic portion of the query.

13. The system of claim 4, wherein the inexpensive algorithm is a backtracking algorithm without memoization over a left deep tree access plans.

14. The system of claim 4, wherein the pool of search space generation algorithms includes at least one of a backtracking algorithm without memoization over left deep tree access plans, a backtracking algorithm with memoization over left deep tree access plans, and a dynamic programming algorithm over the bushy tree access plans.

15. The article of manufacture of claim 1, wherein the optimization block represents an atomic portion of the query.

16. The article of manufacture of claim 1, wherein the inexpensive algorithm is a backtracking algorithm without memoization over a left deep tree access plans.

17. The article of manufacture of claim 1, wherein the pool of search space generation algorithms includes at least one of a backtracking algorithm without memoization over left deep tree access plans, a backtracking algorithm with memoization over left deep tree access plans, and a dynamic programming algorithm over the bushy tree access plans.

* * * * *